No. 862,006. PATENTED JULY 30, 1907.
F. J. McDONNELL.
CAR FENDER.
APPLICATION FILED DEC. 4, 1906.

WITNESSES

INVENTOR
Francis J. McDonnell
BY
ATTORNEYS

No. 862,006. PATENTED JULY 30, 1907.
F. J. McDONNELL.
CAR FENDER.
APPLICATION FILED DEC. 4, 1906.

2 SHEETS—SHEET 2.

Fig. 2.

WITNESSES
INVENTOR
Francis J. McDonnell
BY
ATTORNEYS

UNITED STATES PATENT OFFICE.

FRANCIS J. McDONNELL, OF NEW BEDFORD, MASSACHUSETTS.

CAR-FENDER.

No. 862,006.   Specification of Letters Patent.   Patented July 30, 1907.

Application filed December 4, 1906. Serial No. 346,203.

*To all whom it may concern:*

Be it known that I, FRANCIS J. McDONNELL, a citizen of the United States, and a resident of New Bedford, in the county of Bristol and State of Massachusetts, have invented a new and Improved Car-Fender, of which the following is a full, clear, and exact description.

This invention relates to car fenders such as are adapted to be carried at the front of a car to prevent persons from being run over.

The object of the invention is to produce a fender of simple construction which will operate efficiently to catch the body on the track and move the same rearwardly, at the same time tipping downwardly so as to hold the body in a place of safety.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of the forward portion of a car to which my invention has been applied; Fig. 2 is a plan of the fender as viewed in a plane just beneath the car floor; in this view, the upper portion of the apron, to be described hereinafter, is removed; both Figs. 1 and 2 represent the car fender in an extended position; and Fig. 3 is a side elevation showing a guide which coöperates with the body of the fender when in operation.

Referring more particularly to the parts, 1 represents the forward portion of the car to which the fender 2 is attached. In order to support the fender, hangers 3 are attached to the under side of the floor just forward of the forward truck 4, as indicated. Substantially in alinement with these hangers 3, I provide drop levers 5 which are pivotally supported at their rear extremities on brackets 6 which are attached to the under side of the floor to the rear of the truck. At their forward extremities, these drop levers are connected by a transverse bar 7, and this bar is supported on the under side of the car floor by means of a plurality of springs 8 which are preferably of helical form, as indicated. Near the forward ends of these drop levers, a bracket 9 is provided, which presents a transverse bar 10 adapted to limit the downward movement of the drop levers, as will be readily understood.

Just to the rear of the bracket 9, I provide a drop frame 11 which extends transversely of the car and is supported upon the drop levers 5 as indicated. This drop frame 11 extends downwardly at the sides so as to coöperate with the hangers 3 in supporting fender beams 12 which are adapted to slide through the hangers and drop frame. When in their forward position, these beams 12 project well beyond the forward portion of the car body as indicated. At their forward extremities, a tilting frame 13 is pivotally attached, the same presenting side bars 14 attached to a main shaft 15. The ends of this shaft 15 are mounted in the beams 12, as indicated most clearly in Fig. 2. At its forward and rear extremities, the frame 13 is provided with transverse shafts 16 and 17 respectively, and these shafts are provided with sprocket wheels 18 about which endless chains 19 pass. These chains are connected by transverse rods 20, so that a continuous apron is formed disposed in a horizontal position forwardly of the car, and which is adapted to support a body which may fall thereupon. Near the forward portion of the tilting frame 13, a driving shaft 21 is provided, which is also provided with sprocket wheels 22, as indicated in Fig. 1. These sprocket wheels are adapted to engage with the under side of the endless chains 19, as represented in Fig. 1. The ends of the shaft 21 project beyond the sides of the tilting frame and are provided with wheels 23 which are adapted to run upon the rails 24.

The extremities of the rear shaft 17 project into guide channels or guide brackets 25 which are attached to the inner faces of the beams 12, as indicated. These guide brackets are curved upon an arc having the axis of the shaft 15 as a center, and operate to limit the up-and-down movement of the rear portion of the frame. Just to the rear of these brackets 25, the beams 12 are connected by a transverse guard 26, and this guard is adapted to prevent a body from passing over the rear end of the apron.

Arrangement is made for enabling the entire forward portion of the fender to be swung downwardly, at the will of the motorman. For this purpose, a push-pin 27 is provided in the forward portion of the car floor, and in a position to be easily reached by the motorman's foot. The lower end of this push-pin rests on the transverse bar 10. From this arrangement, when the motorman presses the pin, the drop frame 11 is moved downwardly, the drop levers 5 swinging about their fulcrums at the rear as an axis of rotation. When the fender is swnug downwardly in this manner, the wheels 23 are brought against the rails 24 and immediately begin to rotate, by reason of their frictional contact therewith. In this way the sprocket wheels 22 operate to drive the chains 19, so that the upper portion of the apron moves rearwardly. In this way, a body which has fallen upon the apron will be carried toward the rear. As soon as it has passed the axis of the shaft 15, the weight of the body will tilt the frame downwardly at the rear. This action of the tilting frame raises the forward portion of the frame so that the wheels 23 are thrown out of touch with the rails 24. Evidently, when this takes place, the movement of the apron will cease. The construction of the guide brackets 25 is such that the tilting frame will be sufficiently depresssd at the rear to enable the body caught under the apron to roll rearwardly against the guard 26, where the body would lie in safety until the car is stopped.

When the fender is in use, it will be carried in the extended position shown in Fig. 1, and where the cars are adapted to run in either direction, each end of the car would be equipped with a fender. The fender not in use will be carried under the rear portion of the car. The fenders may readily be slid inwardly so as to occupy the position indicated by dotted lines in Fig. 1.

It should be understood that the forward edge of the tilting frame is quite near the track, so that if a body is struck, it falls upon the apron, whereupon the rearward movement of the apron carries the body to the back of the tilting frame.

Having thus described my invention, I claim as new and desire to secure by Letters Patent:

1. In a car fender, in combination, hangers adapted to be attached to the car body, fender beams supported by said hangers and projecting forwardly from the car, a tilting frame supported between said beams, an apron mounted on said tilting frame and adapted to be depressed at the rear, means for limiting the downward movement of the rear portion of said tilting frame, wheels carried by the forward portion of said tilting frame and adapted to be depressed to strike the rails, means for driving said apron from said wheels, and means for depressing said beams to bring said wheels upon the rails.

2. In a car fender, in combination, hangers adapted to be attached to the car body, a drop frame disposed forwardly of said hangers, means for normally holding said drop frame in an elevated position, beams supported on said hangers and said drop frame and extending forwardly of the car body, a tilting frame mounted between said beams, an endless apron carried by said tilting frame, wheels carried by said tilting frame and adapted to engage the rails when said drop frame is depressed, means for driving said apron from said wheels, a transverse shaft supporting said tilting frame near the middle portion thereof, whereby a body passing rearwardly of said shaft may depress the rear portion of said tilting frame, means whereby a depression of the rear portion of said tilting frame may discontinue the driving of said apron, means for limiting the tilting of said tilting frame, and means for depressing said drop frame.

In testimony whereof I have signed my name to this specification in the presence of two subscribing witnesses.

FRANCIS J. McDONNELL.

Witnesses:
WILLIAM B. AMES,
ANDREW J. A. TIERNAN.